Figure 1:
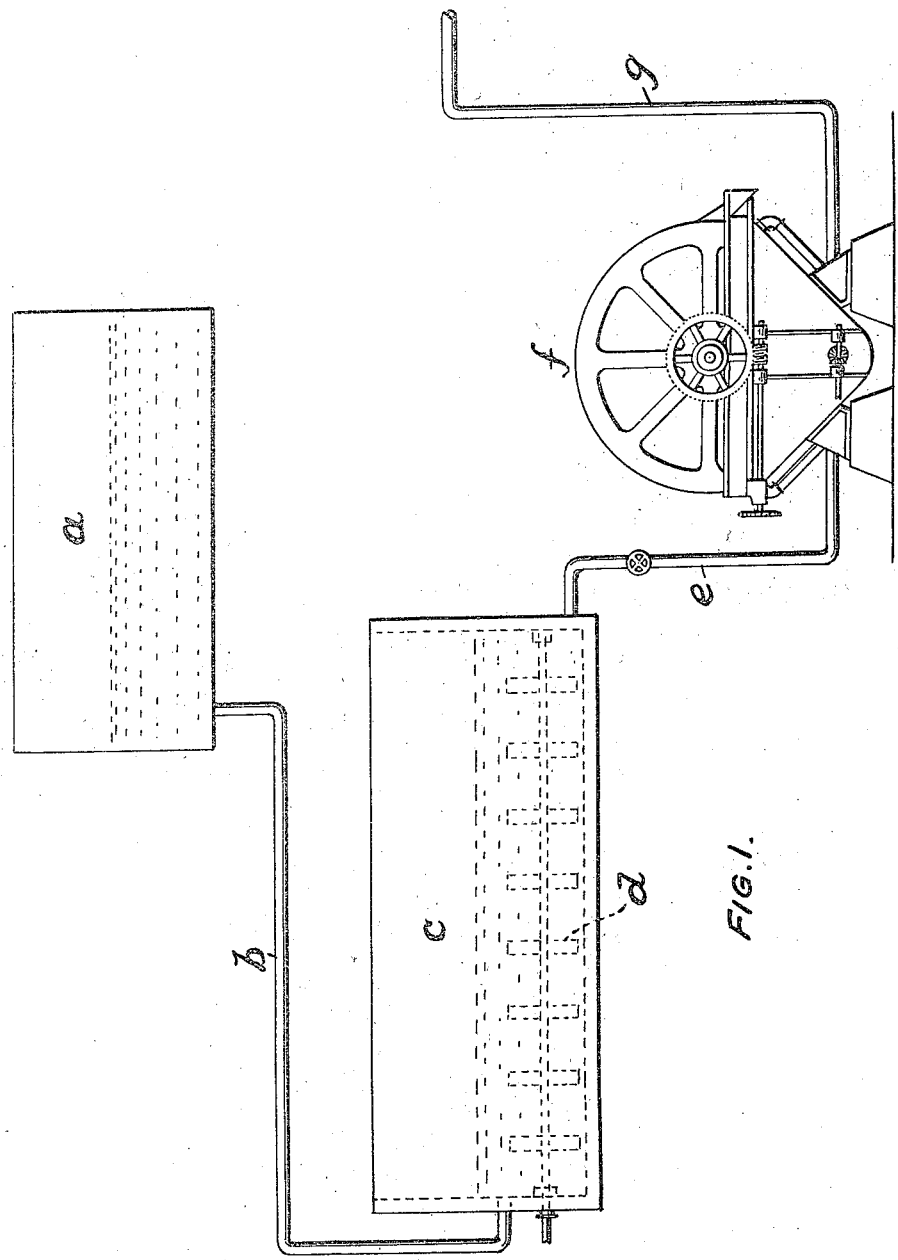

L. S. FINCH.
PROCESS OF PRODUCING AMMONIA FROM ALKALI FERROCYANID.
APPLICATION FILED JULY 23, 1918.

1,295,293.

Patented Feb. 25, 1919.
2 SHEETS—SHEET 2.

WITNESS:
Rob. R. Kitchel.

INVENTOR
Leon S. Finch
BY
Frank S. Busser
ATTORNEY.

UNITED STATES PATENT OFFICE.

LEON S. FINCH, OF DOVER, NEW JERSEY, ASSIGNOR TO HERCULES POWDER COMPANY, OF WILMINGTON, DELAWARE, A CORPORATION OF DELAWARE.

PROCESS OF PRODUCING AMMONIA FROM ALKALI FERROCYANID.

1,295,293.  Specification of Letters Patent.  Patented Feb. 25, 1919.

Application filed July 23, 1918. Serial No. 246,360.

*To all whom it may concern:*

Be it known that I, LEON S. FINCH, a citizen of the United States, residing at Dover, county of Morris, and State of New Jersey, have invented a new and useful Improvement in Processes of Producing Ammonia from Alkali Ferrocyanid, of which the following is a full, clear, and exact description, reference being had to the accompanying drawings, which form a part of this specification.

This invention relates to the hydrolysis of alkali metal ferro-cyanids into ammonia and other compounds. The invention is applicable to the production of ammonia from cyanid produced by passing nitrogen over a mixture of an alkali or alkaline earth metal compound (such as sodium carbonate), carbon and finely divided iron, thereby forming a cyanid of the alkali metal used. This method is old and well known and has been successfully practised and even commercially used in Europe. The process, however, has not gone into general use, largely because of the practical difficulties encountered in the attempt to secure a good yield of ammonia from the cyanid.

It is well known that when cyanids are subjected to the action of steam at a relatively high temperature ammonia is formed. With sodium cyanid, the equation would be:

(1) $NaCN + 2H_2O = HCO_2Na + NH_3$ 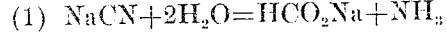

Where, however, the product of the cyanid-forming reaction contains carbon, iron, sodium ferro-cyanid, sodium hydrate and sodium carbonate, the simple method of distilling with steam, or the other obvious expedient of adding water and heating under pressure in an autoclave, gives comparatively poor results, even when the insoluble materials (carbon and iron) are entirely removed.

Where carbon alone is used, or where, in addition to carbon, iron is employed as a catalyzer in relatively small proportions, or where, due to some particular method of procedure, no alkali metal ferro-cyanid is formed, or comparatively little alkali metal ferro-cyanid is formed, it is found possible to hydrolyze the cyanid mixture to ammonia, even though the same contains other impurities, by mixing the cyanid mixture with water, agitating, and filtering in so speedy and continuous a manner as to prevent or minimize, in case iron is present in the solution, the formation of ferro-cyanid, and then distilling off the ammonia, with heat, in a still in which is maintained a substantially constant pressure, the required pressure being surprisingly low and the yield of ammonia being practically quantitative after the distilling operation has proceeded for some little time. This process forms the subject-matter of an application filed of even date herewith, Serial No. 245,279.

Where, however, the aqueous solution passing to the still contains a considerable proportion of ferro-cyanid, it is found impossible to hydrolyze efficiently the ferro-cyanid under the low pressure conditions well adapted to the hydrolysis of the cyanid. Only the cyanid and a very small amount of sodium ferro-cyanid will be converted into ammonia and the yield of ammonia from the mixed cyanids will be proportionately reduced. The presence of a large proportion of ferro-cyanid may be due, partially, to the large proportion of iron used in the cyanid process. The use of large percentage of iron is generally, but erroneously, supposed to be necessary; by far the highest yields of alkali metal cyanid being produced when the proportion of iron is about ten or twelve per cent. The use of some iron, however, is desirable, because its presence makes it possible to conduct the cyanid-forming process at a temperature much lower than is possible where carbon alone is used. Under proper conditions of operation, ferro-cyanid will be produced in very small quantity.

However, although the mixture may contain little ferro-cyanid, upon the addition of water, the conversion of cyanid into ferro-cyanid proceeds, and if the mixing operation or the filtration operation is a relatively slow one, or if the solution is allowed to stand, ferro-cyanid will form in considerable quantities and, as before stated, its hydrolysis to ammonia will be almost impossible under conditions adapted to the hydrolysis of the cyanid.

Where, due to any of the aforementioned causes, the aqueous solution contains a considerable proportion of ferro-cyanid, it may be advisable, rather than to attempt to simultaneously convert to ammonia both the cyanid and ferro-cyanid, to convert all or most of the cyanid to ferro-cyanid and then modify the distilling process to adapt it to the treatment of ferro-cyanid. My invention comprises such a modification, and it is, of course, adapted to the treatment of ferro-cyanid however it may be produced. My invention comprises not only a process for hydrolyzing ferro-cyanid to ammonia, but also contemplates the conversion of mixed cyanid and ferro-cyanid to ferro-cyanid preparatory to its distillation, and even contemplates the preliminary conversion of cyanid to ferro-cyanid where no ferro-cyanid is initially present. The present process exhibits features common to the process for treating cyanid, which features are claimed in the application hereinbefore mentioned, the subject-matter claimed herein being such modification of said process as adapts it to the production of ferro-cyanid and its hydrolysis into ammonia.

While the process is not dependent for its execution upon any particular apparatus, it is preferred to carry out the process in an apparatus constructed substantially in accordance with the accompanying drawings, wherein—

Figure 2:
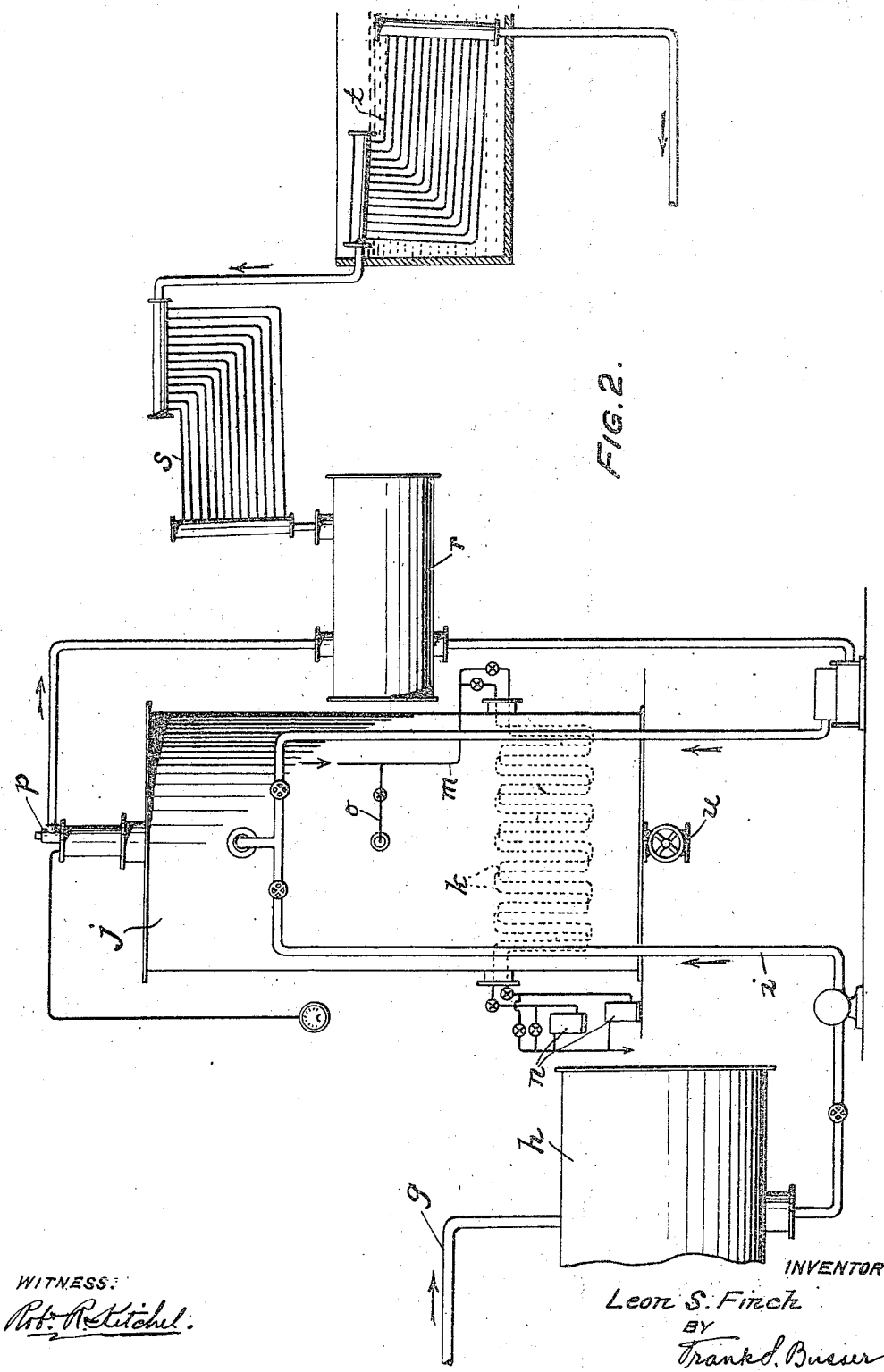

Figures 1 and 2 are diagrammatic views showing two parts of the apparatus.

It may be assumed that the cyanized material contains sodium cyanid, sodium ferro-cyanid, sodium hydrate, small quantities of sodium carbonate and sodium sulfate, and carbon and iron. The material is cooled in an atmosphere of nitrogen, powdered, and one part of powdered material is agitated with one to three parts of water in a suitable tank, sufficient time being allowed for the sodium cyanid to react with the iron to form sodium ferro-cyanid, according to the following equation:

(2) 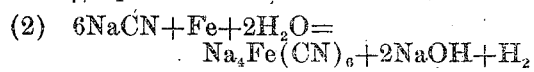
$$6NaCN + Fe + 2H_2O = Na_4Fe(CN)_6 + 2NaOH + H_2$$

In Fig. 1, $a$ represents a tank containing water or a weak cyanid, or ferro-cyanid, or mixed cyanid and ferro-cyanid solution. A pipe $b$ leads from the tank $a$ to the mixing tank $c$, in which rotates a shaft carrying beaters $d$ that maintain the cyanid solution and insoluble materials agitated until the above reaction is substantially completed.

If only a small amount of iron has been used as a catalyst, it may be necessary to add more finely divided iron or iron oxid in order to satisfy the above equation. The time of reaction may vary from one to twenty-four hours.

From the mixing tank, a pipe $e$ leads to a filter $f$. This filter may be of the rotary continuous type shown, which filters rapidly and continuously, or it may be a filter of any efficient type. It need not be rapid or continuous in its action. From the filter, the ferro-cyanid solution may pass direct to the still $j$ (see Fig. 2); but it is preferred to convey it through a pipe $g$ to a storage tank $h$. From the tank $h$ the liquor may be pumped through a pipe $i$ to the still.

The strong sodium ferro-cyanid liquor obtained by the filtration may contain only a trace of sodium cyanid, but it is not necessary to the successful execution of the process that the conversion to sodium ferro-cyanid should be complete. A considerable quantity of sodium cyanid may be present in the solution without preventing the successful execution of the distilling process.

The still $j$ is approximately half-filled. Within the still, preferably the lower part, are steam coils $k$, which at one end are connected with steam inlet pipes $m$ and at the other end with steam traps $n$. There is also a steam pipe $o$ entering the interior of the still, which provides an efficient way to rapidly heat the contents of the still when the solution becomes too concentrated. The pipe $o$ should extend beneath the surface of the cyanid solution.

At the top of the still is a pressure relief valve $p$ which controls the passage of the distillate to a trap tank $r$. The trap $r$ is also connected with a reflux condenser $s$, which may be air-cooled, but which is preferably water-cooled. The condenser $s$ is connected with an ordinary water-cooled condenser $t$, which is tipped downward so as to drain into a neutralizing tub (not shown).

Steam at about 140 pounds pressure is preferred. If the solution in the still is too concentrated, it is advisable to admit steam direct into the still, thereby more rapidly heating the contents and at the same time reducing the concentration. When the solution is of the concentration desired, steam should be admitted solely to the steam coils.

The relief valve is set to open at a pressure not less than 80 pounds per square inch, and it is preferred to set it so that a much higher pressure will be maintained. At a pressure of less than 80 pounds the yield will not be efficient. The preferable pressure is nearer 150 pounds to the square inch. The higher pressure is preferred because the higher the pressure the more rapid will be the hydrolysis of the sodium ferro-cyanid to ammonia. Then too the preferred pressure may be varied with the composition of the solution, its concentration and the desired rate of distillation. Substantial uniformity of pressure, which is secured by means of the relief valve, is of importance, and seems to be necessary in order that the process shall operate efficiently and without mechanical trouble.

The distillate (steam and ammonia) escaping at the relief valve passes to the trap tank $r$ and thence to the reflux (preferably water-cooled) condenser $s$. Nearly all the moisture which escapes with the ammonia is condensed in the condenser $s$ and returns to the trap tank. The ammonia which passes on through the condenser $s$ is cooled by passing through the water-cooled condenser $t$, which drains into the neutralizing tub above mentioned.

At the start of the run gaseous ammonia is produced and at the end of the run aqueous ammonia. It is not especially sought, however, to produce gaseous ammonia, but a strong ammonia solution, so that the subsequent neutralized liquor will require as little evaporation as possible. Hence, all distillate which collects in condenser $t$ is allowed to pass into the neutralizing tub.

The ammonia which passes through condenser $t$ is stronger than that which is condensed by the reflux condenser $s$. The strength of the ammonia which passes into the neutralizing tub depends upon the relative sizes of the two condensers and the manner in which the condenser $s$ is cooled. A relatively large reflux condenser will condense relatively more moisture and the ammonia passing through condenser $t$ will be relatively stronger, provided other operations are the same.

The aqueous ammonia which collects in the trap tank $r$ is much weaker than that which passes into the neutralizing tub. This weak distillate may be utilized as such, or it may be pumped back into the hydrolyzing still and redistilled, giving a strong ammonia. The pumping back into the still of this weak aqueous ammonia is also advantageous in that the liquor in the still is prevented from reaching too high a concentration.

The sludge left in the still may be drawn off through a valve gate $u$ and is used in the manufacture of more sodium ferro-cyanid or for the production of formate compounds.

By the process described, from 40 to 80 per cent. of the theoretical ammonia distils off during the first hour. At the end of less than six hours practically 100 per cent. of the theoretical ammonia is distilled off. These results are attained with a full sized apparatus operating on a commercial scale. The rate at which the ammonia distils off will depend upon the size and construction of the apparatus, the temperature and pressure, and the concentration of the liquor in the tank.

The decomposition probably takes place according to the following equation:

(3) $Na_4Fe(CN)_6 + 2NaOH + 12H_2O =$
$6NaCOOH + 6NH_3 + Fe(OH)_2$.

From this reaction it will be seen that in order to get a complete hydrolysis of the sodium ferro-cyanid into ammonia, it will be necessary to have enough sodium hydrate present to satisfy the reaction. This will probably automatically be taken care of due to the fact that in the preparation of cyanized material from sodium carbonate, some of the sodium carbonate which is not completely fixed to sodium cyanid will be reduced to sodium oxid. The sodium oxid on filtration will then react with the water to give the sodium hydrate which is called for in this reaction. Moreover, by referring to equation 2, it will be seen that for every molecule of sodium ferro-cyanid formed from sodium cyanid, there are also formed two molecules of sodium hydrate. This amount of sodium hydrate is the exact theoretical amount required to satisfy equation 3. Hence it will probably not be necessary to add any hydrate, but in some cases it may be advisable to do so.

While actual practice demonstrates the success of the process as applied to a sodium ferro-cyanid solution containing sodium cyanid and the impurities hereinbefore specified, it is believed that the process will operate equally well where other impurities are present as the result of producing the ferro-cyanid by other processes. Impurities do not apparently affect the reaction. Nor is the process limited to a ferro-cyanid produced from sodium carbonate. The ferro-cyanid may be made from other alkali or alkaline earth metal compounds. Generally speaking, the process is applicable to any ferro-cyanid, however produced, whether pure or impure, it being understood that in the known processes for producing ferro-cyanid, especially those in which an alkali metal salt, carbon and iron, are acted upon by nitrogen, the presence of impurities corresponding to those hereinbefore mentioned, is unavoidable. One of the advantages of the process is that it is not essential, on the one hand, to purify the solution resulting from leaching the material from the furnace, nor, on the other hand, to make any addition to the leached solution.

Having now fully described my invention, what I claim and desire to protect by Letters Patent is:

1. The process of producing ammonia from a solution of alkali metal ferro-cyanid which comprises distilling off the ammonia by heat while maintaining the solution under a substantially constant pressure not less than 80 pounds to the square inch.

2. The process of producing ammonia from a solution of alkali metal ferro-cyanid which comprises subjecting the solution to heat and pressure within a confined still and providing for the intermittent escape of the distillate whenever the pressure reaches a predetermined maximum, said maximum being not less than 80 pounds to the square inch.

3. The process of producing ammonia from a solution of alkali metal ferro-cyanid which comprises subjecting the solution to heat and to a pressure not less than 80 pounds to the square inch to distil off ammonia and water vapor, and condensing out water vapor from the distillate and returning it to the still.

4. The process of producing ammonia from a solution of alkali metal ferro-cyanid which comprises distilling off ammonia and water vapor by heat while maintaining the solution under a pressure not less than 80 pounds to the square inch, and subjecting the distillate to a plurality of successive condensations at progressively decreasing temperatures.

5. The process of producing ammonia from a solution of alkali metal ferro-cyanid which comprises distilling off ammonia and water vapor by heat while maintaining the solution under a pressure not less than 80 pounds to the square inch, condensing out water and vapor from the distillate, returning the condensed vapor to the solution, and subjecting the uncondensed distillate to further condensation.

6. The process of producing ammonia from alkali metal cyanid, iron and carbon, which consists in adding to the mixture a liquor consisting wholly or mainly of water, mixing and agitating until a substantial amount of cyanid, by reaction with the iron, is converted to ferro-cyanid, removing insoluble material from the aqueous ferro-cyanid solution, and distilling off the ammonia by heat and pressure.

7. The process of producing ammonia from alkali metal cyanid, iron and carbon, which consists in adding to the mixture a liquor consisting wholly or mainly of water, mixing and agitating until a substantial amount of cyanid, by reaction with the iron, is converted to ferro-cyanid, removing insoluble material from the aqueous ferro-cyanid solution, and distilling off the ammonia by heat while maintaining the solution under a substantially constant pressure not less than 80 pounds to the square inch.

8. The process of producing ammonia from a mixture containing alkali metal cyanid, which consists in making an aqueous solution of the cyanid, adding iron to effect the conversion of more or less of the cyanid to ferro-cyanid and distilling off the ammonia by heat and pressure.

9. The process of producing ammonia from a mixture containing alkali metal cyanid and alkali metal ferro-cyanid, which consists in making an aqueous solution of the cyanid and ferro-cyanid, adding iron to effect the conversion of more or less of the cyanid to ferro-cyanid, and distilling off the ammonia by heat and pressure.

In testimony of which invention, I have hereunto set my hand, at Kenvil, N. J., on this 19th day of July, 1918.

LEON S. FINCH.